US012646210B2

(12) United States Patent (10) Patent No.: US 12,646,210 B2
Jeong et al. (45) Date of Patent: Jun. 2, 2026

(54) APPARATUS AND METHOD FOR GENERATING DEPTH MAP BY USING VOLUMETRIC FEATURE

(71) Applicant: 42DOT INC., Seoul (KR)

(72) Inventors: Seong Gyun Jeong, Yongin (KR); Jung Hee Kim, Seoul (KR); Phuoc Tien Nguyen, Suwon (KR); Jun Hwa Hur, Seoul (KR)

(73) Assignee: 42DOT INC.

( * ) Notice: Subject to any disclaimer, the term of this patent is extended or adjusted under 35 U.S.C. 154(b) by 355 days.

(21) Appl. No.: 18/355,662

(22) Filed: Jul. 20, 2023

(65) Prior Publication Data

US 2024/0037791 A1 Feb. 1, 2024

(30) Foreign Application Priority Data

Jul. 29, 2022 (KR) ........................ 10-2022-0094995
Jul. 29, 2022 (KR) ........................ 10-2022-0095016

(51) Int. Cl.
*G06T 7/80* (2017.01)
*G06T 3/16* (2024.01)
*G06T 7/50* (2017.01)

(52) U.S. Cl.
CPC .................. *G06T 7/80* (2017.01); *G06T 3/16* (2024.01); *G06T 7/50* (2017.01); *G06T 2207/10028* (2013.01)

(58) Field of Classification Search
CPC .... G06T 7/80; G06T 3/16; G06T 7/50; G06T 2207/10028; G06T 7/20; G06T 2207/10016; G06T 2207/20016; G06T 2207/20081; G06T 2207/20084; G06T 2207/30244; G06T 2207/30252; B60R 2300/303; B60R 2300/607; B60R 1/27
See application file for complete search history.

(56) References Cited

FOREIGN PATENT DOCUMENTS

CN 111612898 A 9/2020

OTHER PUBLICATIONS

Choe, Jaesung "VolumeFusion: Deep Depth Fusion for 3D scene Reconstruction" Proceedings of the IEEE/CVF International Conference on Computer Vision (ICCV), (Year: 2021).*
Surround Depth: Entangling Surrounding Views for Self-Supervised Multi-Camera Depth Estimation, Yi Wei et al, Published: Apr. 2022.
BEV Depth: Acquisition of Reliable Depth for Multi-view 3D Object Detection, Yinhao Li et al, Published: Jun. 2022.

* cited by examiner

*Primary Examiner* — Molly Wilburn
(74) *Attorney, Agent, or Firm* — Harvest IP Law, LLP

(57) ABSTRACT

Provided are an apparatus and method for generating a depth map by using a volumetric feature. The method may generate a single feature map for a base image included in a surround-view image by performing encoding and postprocessing on the base image, and generate a volumetric feature by encoding the single feature map with depth information and then projecting a result of the encoding into a three-dimensional space. In this method, a depth map of a surround-view image may be generated by using a depth decoder to decode a volumetric feature.

8 Claims, 12 Drawing Sheets

SURROUND-VIEW IMAGE ($I^t_{1 \sim N}$)

SURROUND-VIEW IMAGE ($I^{t+1}_{1 \sim N}$)

$F_i$ : Image feature

Per-view
Image features

630

610

620

$\otimes$
Outer
product

2D→3D
Projection z x y

: Overlap features

: Non-overlap features

Depth positonal encoding 3D volumetric space

640

Overlap
region MLP

MLP

Non-overlap
region MLP

MLP $\oplus$ volumetric encoder volumetric
feature(V)

FIG. 8A
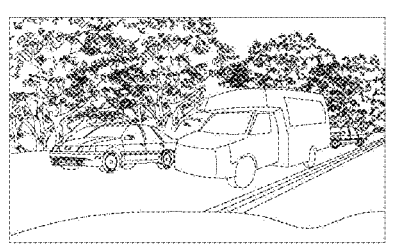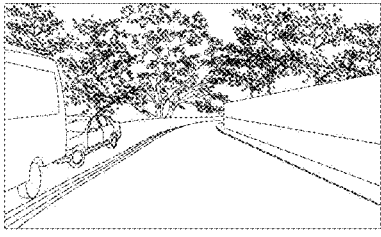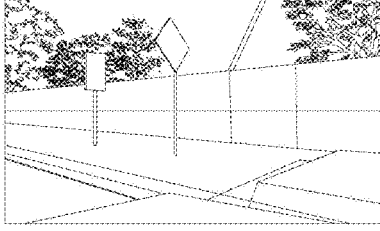
FIG. 8B
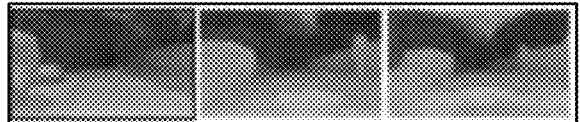
FIG. 8C
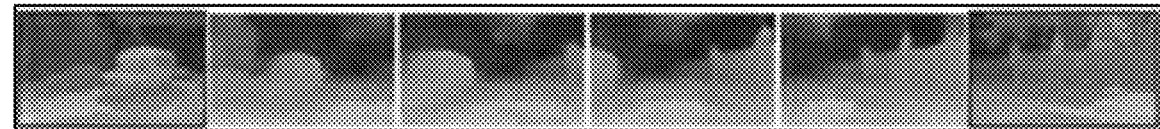
FIG. 8D
FIG. 8E
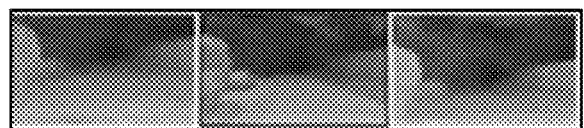

<Self-supervidsed Learning>

FIG. 11

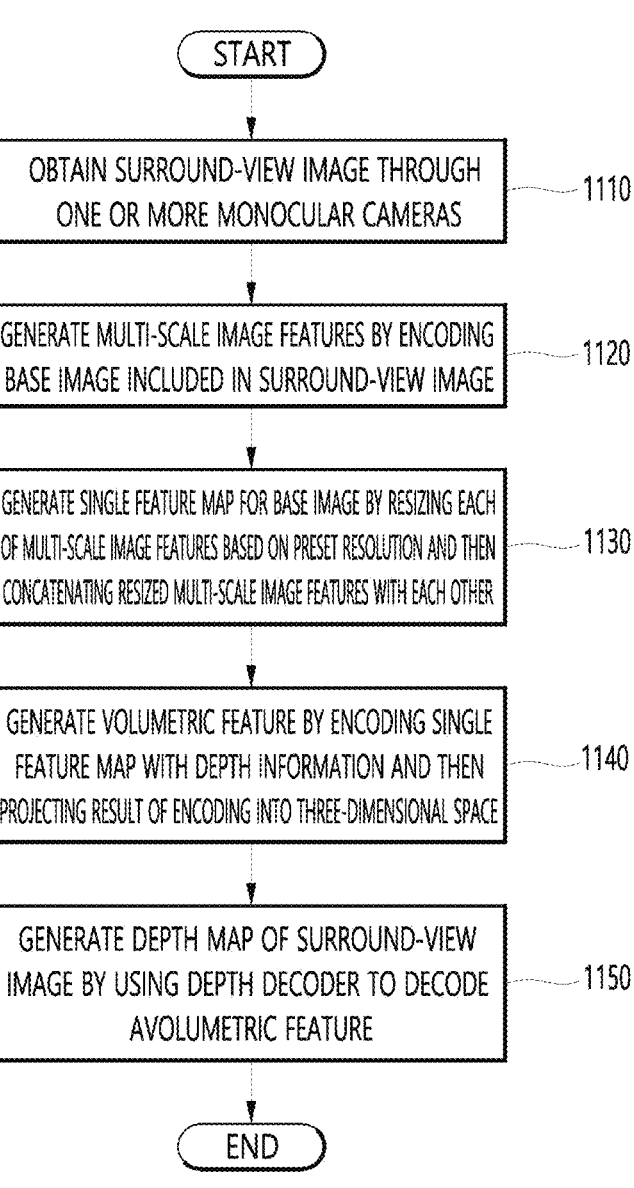

START

OBTAIN SURROUND-VIEW IMAGE THROUGH
ONE OR MORE MONOCULAR CAMERAS —— 1110

GENERATE MULTI-SCALE IMAGE FEATURES BY ENCODING
BASE IMAGE INCLUDED IN SURROUND-VIEW IMAGE —— 1120

GENERATE SINGLE FEATURE MAP FOR BASE IMAGE BY RESIZING EACH
OF MULTI-SCALE IMAGE FEATURES BASED ON PRESET RESOLUTION AND THEN
CONCATENATING RESIZED MULTI-SCALE IMAGE FEATURES WITH EACH OTHER —— 1130

GENERATE VOLUMETRIC FEATURE BY ENCODING SINGLE
FEATURE MAP WITH DEPTH INFORMATION AND THEN
PROJECTING RESULT OF ENCODING INTO THREE-DIMENSIONAL SPACE —— 1140

GENERATE DEPTH MAP OF SURROUND-VIEW
IMAGE BY USING DEPTH DECODER TO DECODE
AVOLUMETRIC FEATURE —— 1150

END

APPARATUS AND METHOD FOR GENERATING DEPTH MAP BY USING VOLUMETRIC FEATURE

CROSS-REFERENCE TO RELATED APPLICATION

This application is based on and claims priority under 35 U.S.C. § 119 to Korean Patent Applications No. 10-2022-0094995, filed on Jul. 29, 2022, and No. 10-2022-0095016 filed on Jul. 29, 2022, in the Korean Intellectual Property Office, the disclosure of which is incorporated by reference herein in its entirety.

BACKGROUND

1. Field

The present disclosure relates to an apparatus and method for generating a depth map by using a volumetric feature.

2. Description of the Related Art

Much research has been conducted on a method of estimating three-dimensional (3D) depth information, which is used in a variety of fields, such as robot vision, human-computer interface, intelligent visual surveillance, or 3D image acquisition. In particular, research on highly accurate depth estimation in an autonomous driving system is required to control a vehicle by recognizing and determining various driving environments including the distance between the vehicle and an object detected in collected image data.

Methods of estimating depth information include methods using signals such as infrared rays, ultrasonic waves, lasers, or scattering properties of light, and methods of analyzing images. Methods of estimating a distance by using infrared rays or ultrasonic waves have a disadvantage in that a reflected signal may be affected by the state of an object. The use of a signal such as a laser has high accuracy, but has a disadvantage in that an expensive additional device is required.

On the contrary, estimating depth information by using a camera does not require a separate additional device. In addition, depth information may be generated based on disparity calculation using a stereo camera, but precise calibration of two cameras is required for accurate depth estimation, and it takes a lot of time to calculate a disparity. Therefore, the need for research on a method of accurately estimating depth information by using a monocular camera is emerging.

The related art described above is technical information that the inventor(s) of the present disclosure has achieved to derive the present disclosure or has achieved during the derivation of the present disclosure, and thus, it cannot be considered that the related art has been published to the public before the filing of the present disclosure.

SUMMARY

Provided are an apparatus and method for generating a depth map by using a volumetric feature. Technical objects of the present disclosure are not limited to the foregoing, and other unmentioned objects or advantages of the present disclosure would be understood from the following description and be more clearly understood from the embodiments of the present disclosure. In addition, it would be appreciated that the objects and advantages of the present disclosure may be implemented by means provided in the claims and a combination thereof.

Additional aspects will be set forth in part in the description which follows and, in part, will be apparent from the description, or may be learned by practice of the presented embodiments of the disclosure.

According to a first aspect of the present disclosure, a method of generating a depth map by using a volumetric feature includes obtaining a surround-view image through one or more monocular cameras, generating multi-scale image features by encoding a base image included in the surround-view image, generating a single feature map for the base image by resizing each of the multi-scale image features based on a preset resolution and concatenating the resized multi-scale image features with each other, generating a volumetric feature by encoding the single feature map with depth information and then projecting a result of the encoding into a three-dimensional space, and generating a depth map of the surround-view image by decoding the volumetric feature using a depth decoder.

According to a second aspect of the present disclosure, an apparatus for generating a depth map by using a volumetric feature includes a memory storing at least one program, and a processor configured to execute the at least one program to obtain a surround-view image through one or more monocular cameras, generate multi-scale image features by encoding a base image included in the surround-view image, generate a single feature map for the base image by resizing each of the multi-scale image features based on a preset resolution and concatenating the resized multi-scale image features with each other, generate a volumetric feature by encoding the single feature map with depth information and then projecting a result of the encoding into a three-dimensional space, and generate a depth map of the surround-view image by decoding the volumetric feature using a depth decoder.

According to a third aspect of the present disclosure, a method of generating pose information of a monocular camera includes obtaining a surround-view image through one or more monocular cameras, generating multi-scale image features by encoding a base image included in the surround-view image, generating a single feature map for the base image by resizing each of the multi-scale image features based on a preset resolution and concatenating the resized multi-scale image features with each other, generating a volumetric feature by encoding the single feature map and then projecting a result of the encoding into a three-dimensional space, and collectively obtaining pose information of the monocular camera at a next time point by using a pose decoder to decode the volumetric feature.

In addition, the collective obtaining of the pose information of the monocular camera may include obtaining a canonical camera motion indicating an amount of change in the pose of a reference monocular camera between the current time point and the next time point by using the pose decoder to decode the volumetric feature, and collectively obtaining pose information of another monocular camera at the next view time point, based on a relationship between extrinsic parameters of the reference monocular camera and the other monocular camera, and the canonical camera motion.

In addition, the obtaining of the canonical camera motion may include flattening the volumetric feature into a bird's eye view (BEV) feature, and decoding the BEV feature by using the pose decoder.

In addition, the method may further include generating a depth map of the surround-view image by decoding the volumetric feature using a depth decoder.

In addition, the method may further include training a neural network by using the surround-view image as input data of the neural network and using the depth map and the canonical camera motion as output data.

In addition, the neural network may be trained such that an image reconstruction loss and a depth synthesis loss are minimized.

In addition, the image reconstruction loss may include a temporal loss, a spatio loss, and a spatio-temporal loss.

In addition, the depth synthesis loss may include a depth consistency loss.

According to a fourth aspect of the present disclosure, an apparatus for generating a depth map by using a monocular camera includes a memory storing at least one program, and a processor configured to execute the at least one program to obtain a surround-view image through one or more monocular cameras, generate multi-scale image features by encoding a base image included in the surround-view image, generate a single feature map for the base image by resizing each of the multi-scale image features based on a preset resolution and concatenating the resized multi-scale image features with each other, generate a volumetric feature by encoding the single feature map with depth information and then projecting a result of the encoding into a three-dimensional space, and collectively obtain pose information of the monocular camera at a next time point based on the volumetric feature.

According to a fifth aspect of the present disclosure, there may be provided a computer-readable recording medium having recorded thereon program for causing a computer to execute the method of the first aspect or the third aspect.

In addition, other methods and systems for implementing the present disclosure, and a computer-readable recording medium having recorded thereon a computer program for executing the methods may be further provided.

Other aspects, features, and advantages other than those described above will be apparent from the following drawings, claims, and detailed description.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 8A to 8E are exemplary diagrams for describing a method of obtaining a depth map according to arbitrary rotational views, according to an embodiment;

FIG. 11 is a flowchart for describing a method of generating a depth map by using a monocular camera, according to an embodiment.

DETAILED DESCRIPTION

Figure 1:
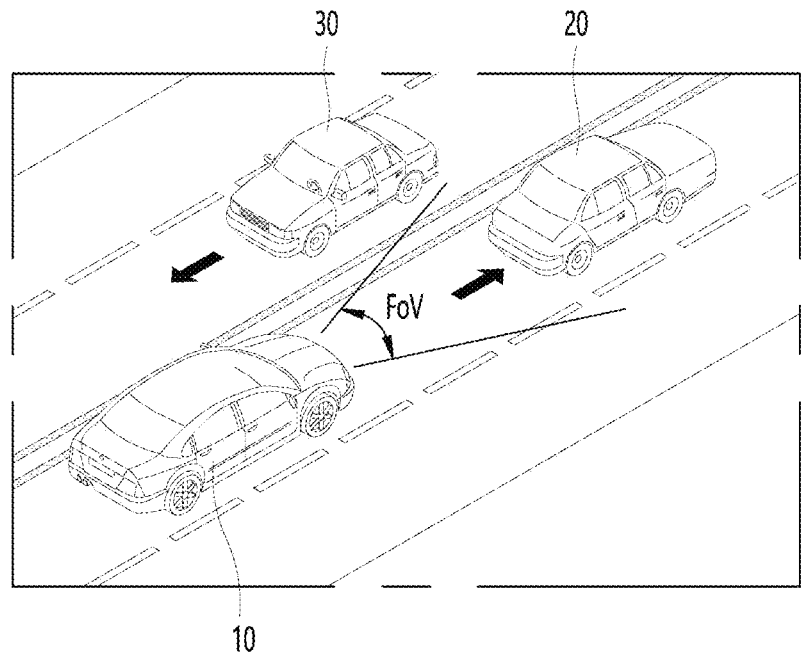
FIGS. 1 to 3 are diagrams for describing an autonomous driving method according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Advantages and features of the present disclosure and a method for achieving them will be apparent with reference to embodiments of the present disclosure described below together with the attached drawings. The present disclosure may, however, be embodied in many different forms and should not be construed as being limited to the embodiments set forth herein, and all changes, equivalents, and substitutes that do not depart from the spirit and technical scope of the present disclosure are encompassed in the present disclosure. These embodiments are provided such that the present disclosure will be thorough and complete, and will fully convey the concept of the present disclosure to those of skill in the art. In describing the present disclosure, detailed explanations of the related art are omitted when it is deemed that they may unnecessarily obscure the gist of the present disclosure.

Terms used herein are for describing particular embodiments and are not intended to limit the scope of the present disclosure. A singular expression also includes the plural meaning as long as it is not inconsistent with the context. As used herein, terms such as "comprises," "includes," or "has" specify the presence of stated features, numbers, stages, operations, components, parts, or a combination thereof, but do not preclude the presence or addition of one or more other features, numbers, stages, operations, components, parts, or a combination thereof.

Some embodiments of the present disclosure may be represented by functional block components and various processing operations. Some or all of the functional blocks may be implemented by any number of hardware and/or software elements that perform particular functions. For example, the functional blocks of the present disclosure may be embodied by at least one microprocessor or by circuit components for a certain function. In addition, for example, the functional blocks of the present disclosure may be implemented by using various programming or scripting languages. The functional blocks may be implemented by using various algorithms executable by one or more processors.

Furthermore, the present disclosure may employ known technologies for electronic settings, signal processing, and/or data processing. Terms such as "mechanism", "element", "unit", or "component" are used in a broad sense and are not limited to mechanical or physical components.

In addition, connection lines or connection members between components illustrated in the drawings are merely exemplary of functional connections and/or physical or circuit connections. Various alternative or additional functional connections, physical connections, or circuit connections between components may be present in a practical device.

Hereinafter, the term 'vehicle' may refer to all types of transportation instruments with engines that are used to move passengers or goods, such as cars, buses, motorcycles, kick scooters, or trucks.

Hereinafter, the present disclosure will be described in detail with reference to the accompanying drawings.

Figure 2:
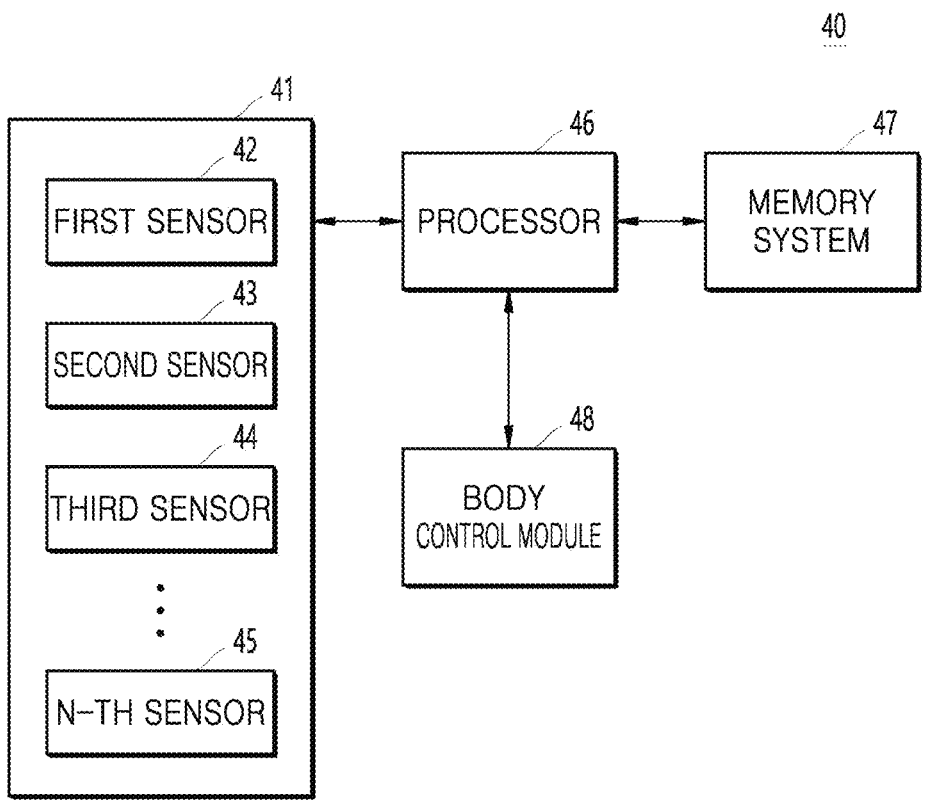
Figure 3:
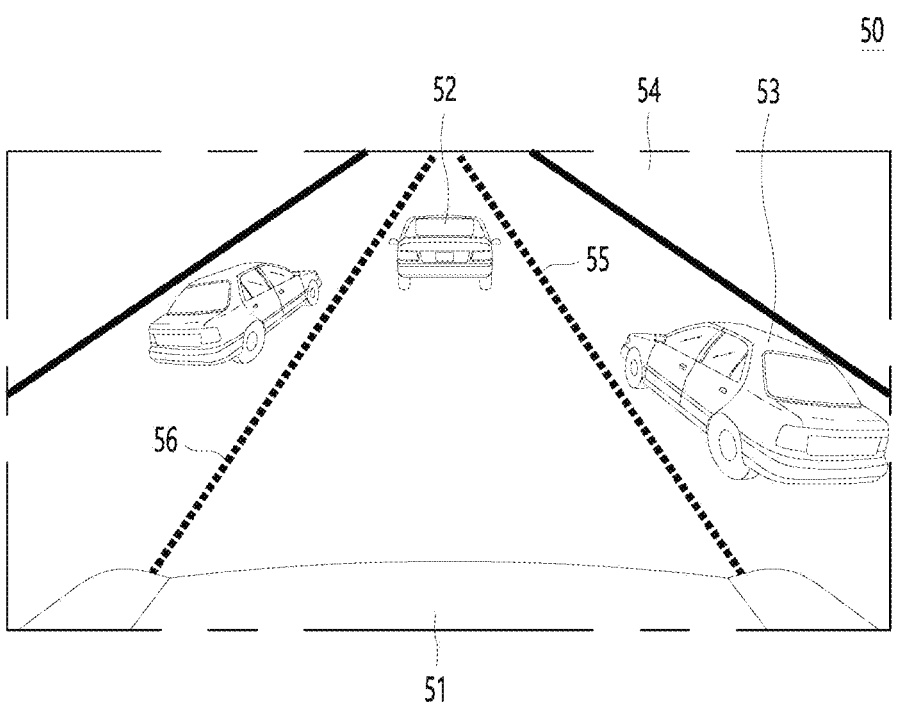

FIGS. 1 to 3 are diagrams for describing an autonomous driving method according to an embodiment.

Referring to FIG. 1, an autonomous driving apparatus according to an embodiment of the present disclosure may be mounted on a vehicle to implement an autonomous vehicle 10. The autonomous driving apparatus mounted on the autonomous vehicle 10 may include various sensors configured to collect situational information around the autonomous vehicle 10. For example, the autonomous driving apparatus may detect a movement of a preceding vehicle 20 traveling in front of the autonomous vehicle 10, through an image sensor and/or an event sensor mounted on the front side of the autonomous vehicle 10. The autonomous driving apparatus may further include sensors configured to detect, in addition to the preceding vehicle 20 traveling in front of the autonomous vehicle 10, another traveling vehicle 30 traveling in an adjacent lane, and pedestrians around the autonomous vehicle 10.

At least one of the sensors configured to collect the situational information around the autonomous vehicle may have a certain field of view (FoV) as illustrated in FIG. 1. For example, in a case in which a sensor mounted on the front side of the autonomous vehicle 10 has a FoV as illustrated in FIG. 1, information detected from the center of the sensor may have a relatively high importance. This may be because most of information corresponding to the movement of the preceding vehicle 20 is included in the information detected from the center of the sensor.

The autonomous driving apparatus may control the movement of the autonomous vehicle 10 by processing information collected by the sensors of the autonomous vehicle in real time, while storing, in a memory device, at least part of the information collected by the sensors.

Referring to FIG. 2, an autonomous driving apparatus 40 may include a sensor unit 41, a processor 46, a memory system 47, a body control module 48, and the like. The sensor unit 41 may include a plurality of sensors 42 to 45, and the plurality of sensors 42 to 45 may include an image sensor, an event sensor, an illuminance sensor, a global positioning system (GPS) device, an acceleration sensor, and the like.

Data collected by the sensors 42 to 45 may be delivered to the processor 46. The processor 46 may store, in the memory system 47, the data collected by the sensors 42 to 45, and control the body control module 48 based on the data collected by the sensors 42 to 45 to determine the movement of the vehicle. The memory system 47 may include two or more memory devices and a system controller configured to control the memory devices. Each of the memory devices may be provided as a single semiconductor chip.

In addition to the system controller of the memory system 47, each of the memory devices included in the memory system 47 may include a memory controller, which may include an artificial intelligence (AI) computation circuit such as a neural network. The memory controller may generate computational data by applying certain weights to data received from the sensors 42 to 45 or the processor 46, and store the computational data in a memory chip.

FIG. 3 is a diagram illustrating an example of image data obtained by a sensor of an autonomous vehicle on which an autonomous driving apparatus is mounted. Referring to FIG. 3, image data 50 may be data obtained by a sensor mounted on the front side of the autonomous vehicle. Thus, the image data 50 may include a front area 51 of the autonomous vehicle, a preceding vehicle 52 traveling in the same lane as the autonomous vehicle, a traveling vehicle 53 around the autonomous vehicle, a background 54, lanes 55 and 56, and the like.

In the image data 50 according to the embodiment illustrated in FIG. 3, data regarding a region including the front area 51 of the autonomous vehicle and the background 54 may be unlikely to affect the driving of the autonomous vehicle. In other words, the front area 51 of the autonomous vehicle and the background 54 may be regarded as data having a relatively low importance.

On the other hand, the distance to the preceding vehicle 52 and a movement of the traveling vehicle 53 to change lanes or the like may be significantly important factors in terms of safe driving of the autonomous vehicle. Accordingly, data regarding a region including the preceding vehicle 52 and the traveling vehicle 53 in the image data 50 may have a relatively high importance in terms of the driving of the autonomous vehicle.

A memory device of the autonomous driving apparatus may apply different weights to different regions of the image data 50 received from a sensor, and then store the image data 50. For example, a high weight may be applied to the data regarding the region including the preceding vehicle 52 and the traveling vehicle 53, and a low weight may be applied to the data regarding the region including the front area 51 of the autonomous vehicle and the background 54.

Figure 4A:
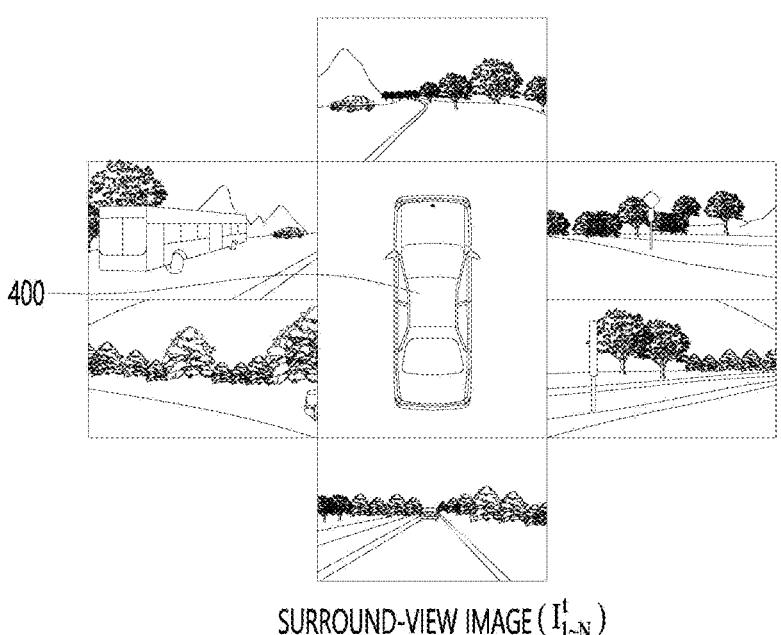
FIGS. 4A to 4B are exemplary diagrams for describing a method of obtaining a surround-view image, according to an embodiment.
Figure 4B:
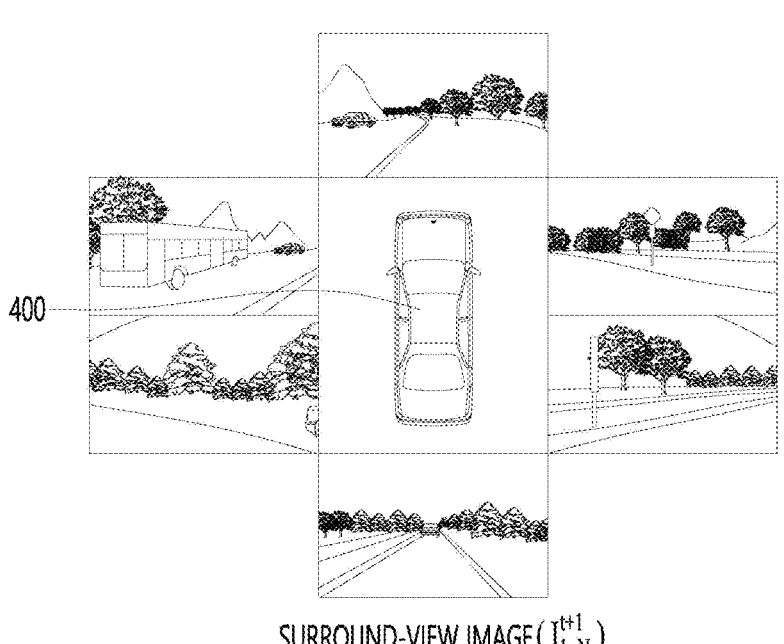

FIGS. 4A to 4B are exemplary diagrams for describing a method of obtaining a surround-view image, according to an embodiment.

An apparatus for generating a depth map (hereinafter, referred to as a 'depth map generation apparatus') may obtain an image of a road on which a vehicle is driving, through one or more monocular cameras.

The one or more cameras may be installed in the vehicle such that they are oriented in different directions to capture images in all directions of the vehicle. Each of the one or more cameras has intrinsic parameters and extrinsic parameters.

The intrinsic parameters may include a focal length, a principal point, a skew coefficient, and the like. The extrinsic parameters are parameters representing the transformation relationship between a camera coordinate system and the world coordinate system, and may include rotation and translation transformation information between the two coordinate systems.

Referring to FIG. 4A, six cameras may be installed in a vehicle 400 to capture images of a front area, a rear area, a front-right area, a rear-right area, a front-left area, and a rear-left area of the vehicle 400, respectively.

An image obtained by each camera installed in the vehicle 400 may be denoted by $I_i$, and for example, images obtained by the respective installed cameras of FIG. 4A may be denoted by $I_1, I_2, \ldots, I_6$.

Comparing FIG. 4A with FIG. 4B, FIG. 4A illustrates six images obtained by the respective cameras at a time point t, and the images may be denoted by $$I_1^t, I_2^t, \ldots I_6^t,$$

respectively. In addition, FIG. 4B illustrates six images obtained by the respective cameras at a time point t+1, and the images may be denoted by $$I_1^{t+1}, I_2^{t+1}, \ldots I_6^{t+1},$$

respectively.

Hereinafter, an image set including a plurality of base images captured at a certain time point by the one or more monocular cameras installed in the vehicle 400 as described above will be referred to as a 'surround-view image'.

Figure 5:
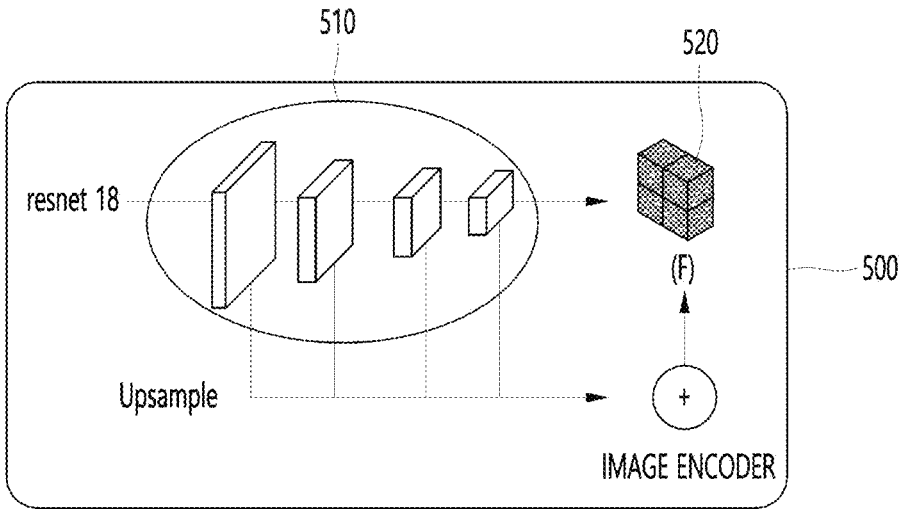
FIG. 5 is a diagram for describing a method of generating a single feature map for a surround-view image by using an image encoder, according to an embodiment.

FIG. 5 is a diagram for describing a method of generating a single feature map for a surround-view image by using an image encoder, according to an embodiment.

The depth map generation apparatus may include an image encoder 500. The image encoder 500 may use a plurality of base images included in a surround-view image as input data.

The image encoder 500 may generate multi-scale image features 510 for a base image. In addition, the image encoder 500 may resize the multi-scale image features 510 based on a preset resolution and then concatenate them with each other to generate a single feature map 520 for the base image.

In detail, referring to FIG. 5, the image encoder 500 may generate the multi-scale image features 510 by decreasing the resolution of the base image by half at a time, by using a convolutional neural network (CNN). For example, the image encoder 500 may use ResNet-18 to generate the multi-scale image features 510 respectively having resolutions of ½, ¼, ⅛, and ¹⁄₁₆ of the resolution (i.e., a resolution of H×W) of the base image. In addition, the image encoder 500 may generate the single feature map 520 by setting a reference resolution to 'H/8×W/8', upsampling the multiscale image features 510, resizing them based on 'H/8×W/8', and concatenating them with each other.

That is, the depth map generation apparatus may generate a single feature map $F_i$ for each base image $I_i$ included in the surround-view image by using the image encoder 500 through the above-described method. For example, the depth map generation apparatus may generate single feature maps $F_1, F_2, \ldots, F_6$ for the plurality of base images $I_1, I_2, \ldots, I_6$ included in the surround-view image, respectively.

Figure 6A:
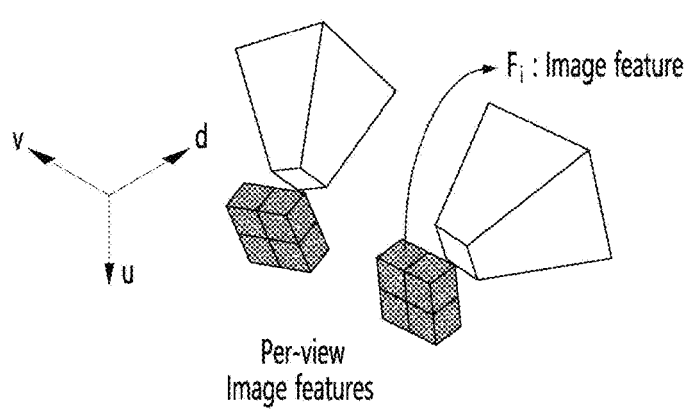
FIGS. 6A to 6C are exemplary diagrams for describing a method of generating a volumetric feature by using a single feature map, according to an embodiment.
Figure 6B:
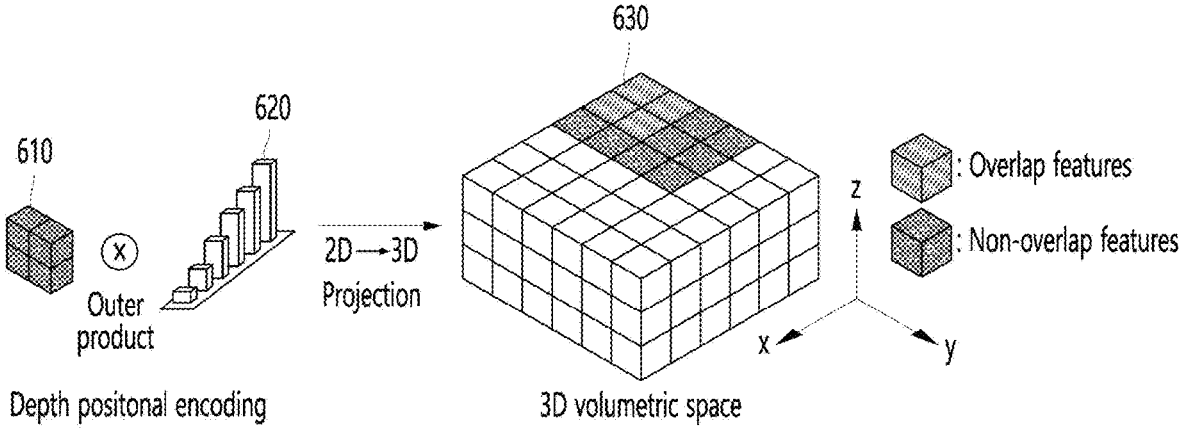
Figure 6C:
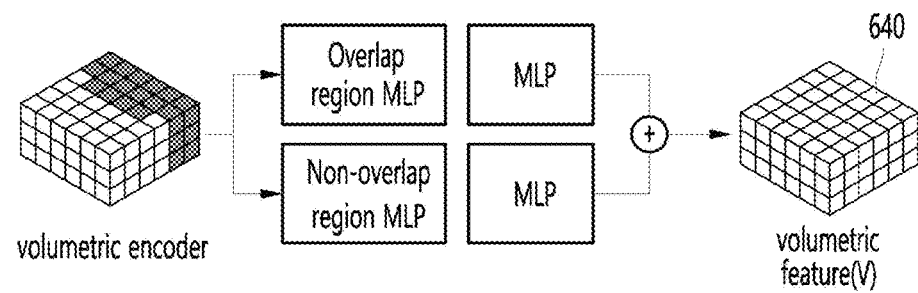

FIGS. 6A and 6C are exemplary diagrams for describing a method of generating a volumetric feature by using a single feature map, according to an embodiment.

The depth map generation apparatus may generate a volumetric feature by encoding a single feature map with depth information and then projecting a result of the encoding into a three-dimensional space.

Referring to FIG. 6A, for a single feature map $F_i$ generated from a base image $I_i$ captured by a certain camera, the depth map generation apparatus may select a set of voxels along a ray from a pixel p to the center of the camera, and set $F_i(p)$ by allocating pixels to the single feature map. The depth map generation apparatus may implement the above process with a mapping function such as backward-warping using intrinsic parameters and extrinsic parameters of the camera.

A single feature map $F_i(p)$ 610 of each pixel p contains high-level information along a ray of the pixel of $F_i(p)$ 610, and thus, referring to FIG. 6B, the depth map generation apparatus may concatenate $F_i(p)$ 610 with depth information 620 of voxel coordinates and encode a result of the concatenating. In addition, the depth map generation apparatus may extract a local three-dimensional feature for each voxel coordinates (x, y, z) by projecting a result of the encoding into a three-dimensional space.

Meanwhile, as spatial overlap occurs in views of a plurality of cameras capturing a surround-view image, some voxels on a three-dimensional volumetric space may be associated with a plurality of single feature maps.

It may be seen from FIG. 6B that some voxels in a three-dimensional volumetric space overlap each other whereas the other voxels do not overlap each other.

The depth map generation apparatus may generate a volumetric feature by inputting the local three-dimensional feature to a volumetric encoder. In an embodiment, the depth map generation apparatus may allocate the voxels to different multi-layer perceptrons (MLPs) according to whether the voxels overlap each other.

It may be seen from FIG. 6C that, after the local three-dimensional feature is input to the volumetric encoder, the voxels overlapping each other and the voxels not overlapping each other are allocated to different MLPs.

The depth map generation apparatus may generate a volumetric feature 640 by fusing together results obtained by allocating the voxels to different MLPs and performing encoding. In the present disclosure, the voxels are allocated to different MLPs according to whether each of them overlaps other voxels to perform encoding, and results of the encoding are fused together to generate the volumetric feature 640, such that each voxel of the volumetric feature 640 encodes a high-dimensional feature associated with three-dimensional geometry.

Figure 7:
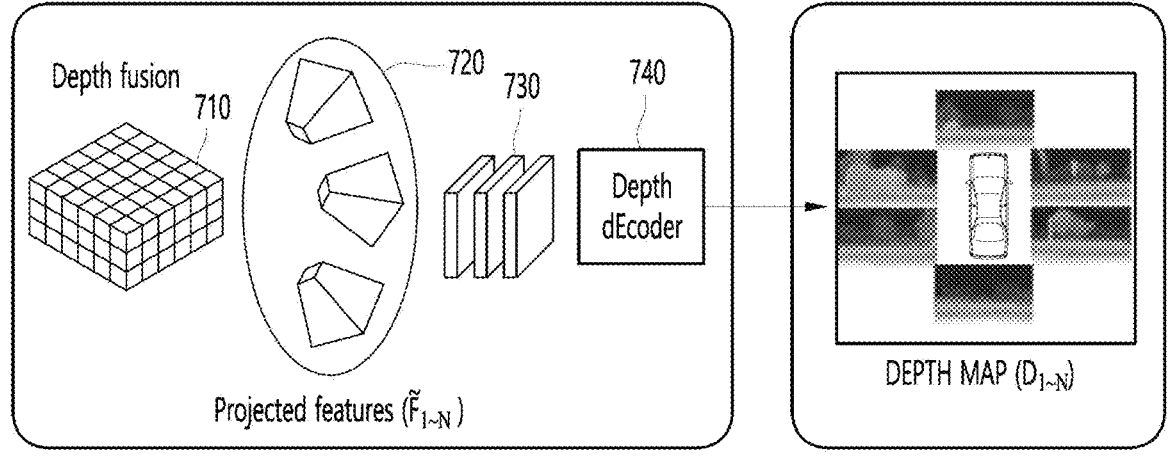
FIG. 7 is an exemplary diagram for describing a method of generating a depth map of a surround-view image, according to an embodiment.

FIG. 7 is an exemplary diagram for describing a method of generating a depth map of a surround-view image, according to an embodiment.

The depth map generation apparatus may transform the volumetric feature generated in FIG. 6C into a projected image feature having a preset resolution, based on intrinsic parameters and extrinsic parameters of one or more cameras installed in the vehicle. Here, the intrinsic parameters may include a focal length, a principal point, a skew coefficient, and the like. The extrinsic parameters are parameters representing the transformation relationship between a camera coordinate system and the world coordinate system, and may include rotation and translation transformation information between the two coordinate systems.

In addition, the depth map generation apparatus may generate a depth map of the surround-view image by using a depth decoder to decode the projected image feature.

In detail, referring to FIG. 7, the depth map generation apparatus may generate a projected image feature $\tilde{F}_i$ 730 having a preset resolution of 'H/8×W/8' by applying an intrinsic parameter $K_i$ and an extrinsic parameter $E_i$ of each camera to a volumetric feature 710. For example, the depth map generation apparatus may generate projected image features $\tilde{F}_1, \tilde{F}_2, \ldots, \tilde{F}_6$ 730 by applying extrinsic parameters $E_1, E_2, \ldots, E_6$ of the respective cameras to the volumetric feature V 710.

The depth map generation apparatus may generate a depth map having a resolution of 'H×W' by using a depth decoder 740 to decode the projected image feature $\tilde{F}_i$ 730 having a resolution of 'H/8×W/8'. For example, the depth map generation apparatus may generate depth maps $D_1, D_2, \ldots, D_6$ by upsampling the projected image features $\tilde{F}_1, \tilde{F}_2, \ldots, \tilde{F}_6$ 730 having a resolution of 'H/8×W/8'.

The depth decoder 740 may consist of three convolutional layers for upsampling and one convolutional layer for depth output, but is not limited thereto.

In the present disclosure, through the method described above with reference to FIGS. 5 to 7, images $I_1, I_2, \ldots, I_6$ obtained as the surround-view image of FIG. 4A respectively by six cameras may be transformed into the depth maps $D_1, D_2, \ldots, D_6$ of FIG. 7.

FIGS. 8A to 8E are exemplary diagrams for describing a method of obtaining a depth map according to arbitrary rotational views, according to an embodiment.

As described above with reference to FIG. 7, the depth map generation apparatus may transform a volumetric feature into a projected image feature having a preset resolution, based on extrinsic parameters of one or more cameras installed in the vehicle.

According to the present disclosure, in this process, the volumetric feature may be transformed into the projected image feature without loss of generality by using a projection matrix from a canonical coordinate system for a desired view, rather than preserving the camera pose. In particular, according to the present disclosure, a new camera pose may be obtained through modulation with the product of a canonical motion and a desired camera pose. That is, the depth map generation apparatus may determine a projection matrix for transforming a volumetric feature into a projected image feature having a preset resolution, and modulate a depth map by using the projection matrix suitable for a desired view.

In addition, because spatial overlaps in a camera view share a common volumetric feature, in the present disclosure, consistent metric scaled depth maps may be predicted.

A method according to the present disclosure may generate a smooth depth map while changing not only an arbitrary focal length but also yaw/roll/pitch angles. That is, in the present disclosure, a smooth depth map may be generated even when the camera pose, rather than an actual captured image, is arbitrarily modulated.

FIG. 8A illustrates images obtained by three cameras installed in a vehicle, and the images correspond to a front-left area, a front area, and a front-right area of the vehicle, respectively.

FIG. 8B corresponds to depth maps obtained by using the method according to the present disclosure to modulate the focus of the cameras with ×1, ×½, and ×⅓ magnifications, respectively, FIG. 8C corresponds to view-interpolation depth maps obtained by using the method according to the present disclosure to modulate the yaw angle with respect to the front-left image and the front-right image, FIG. 8D corresponds to depth maps obtained by using the method according to the present disclosure to modulate the roll angle with respect to the front image by ±10°, and FIG. 8E corresponds to depth maps obtained by using the method according to the present disclosure to modulate the pitch angle with respect to the front image by ±3°.

Figure 9:
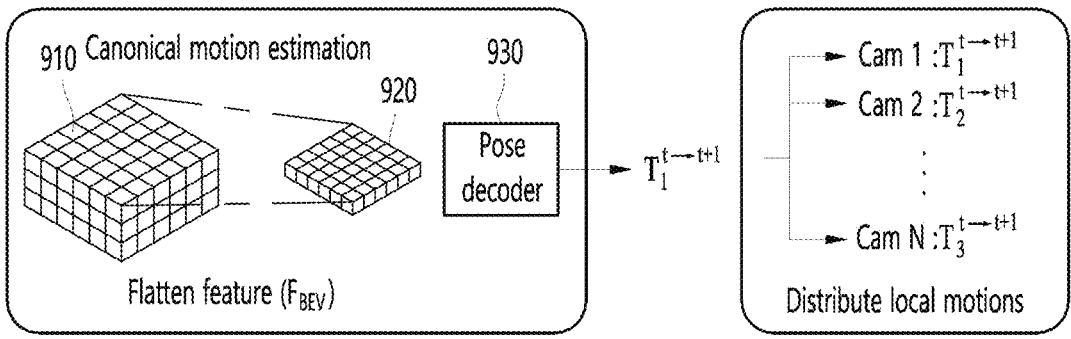
FIG. 9 is an exemplary diagram for describing a method of performing canonical motion prediction, according to an embodiment.

FIG. 9 is an exemplary diagram for describing a method of performing canonical motion prediction, according to an embodiment.

The depth map generation apparatus may flatten the volumetric feature generated in FIG. 6C into a bird's eye view (BEV) feature. In addition, the depth map generation apparatus may obtain a canonical camera motion indicating an amount of change in the camera pose of a reference monocular camera between the current time point and the next time point, by using a pose decoder to decode the BEV feature. Here, the term 'motion' refers to the amount of change in the pose of the reference monocular camera between the current time point and the time point. The depth map generation apparatus may collectively obtain pose information of other monocular cameras at the next time point, based on a relationship between extrinsic parameters of the reference monocular camera and the other monocular cameras, and the canonical camera motion.

In detail, referring to FIG. 9, the depth map generation apparatus may generate a flattened BEV feature $F_{BEV}$ 920 (i.e., $F_{BEV} \in R^{X \times Y \times C'}$) by collapsing the Z-axis of a volumetric feature 910 ($V \in R^{X \times Y \times Z \times C}$) to a channel dimension C (i.e., reshaping into a three-dimensional tensor $V' \in R^{X \times Y \times (Z \cdot C)}$) and applying two-dimensional convolution.

In addition, the depth map generation apparatus may obtain a canonical camera motion $T^{t \to t+1}$ by using a pose decoder 930. The canonical camera motion $T^{t \to t+1}$ denotes an amount of change in the camera pose of a reference monocular camera (e.g., a front monocular camera) between a current time point t and a next time point t+1.

The depth map generation apparatus may collectively obtain pose information of other monocular cameras at the next time point, based on a relationship between extrinsic parameters of the reference monocular camera and the other monocular cameras, and the canonical camera motion. This may be expressed as in Equation 1 below. In Equation 1 below, $E_1$ denotes an extrinsic parameter of the reference monocular camera.

$$T_i^{t \to t+1} = E_i^{-1} E_1 T^{t \to t+1} E_1^{-1} E_i \qquad \text{[Equation 1]}$$

Referring to FIG. 9, in a case in which a total of N monocular cameras are installed in the vehicle, the depth map generation apparatus may collectively obtain pose information $$T_1^{t \to t+1}, T_2^{t \to t+1}, \ldots, T_N^{t \to t+1}$$

of monocular cameras other than the reference monocular camera at the next time point t+1 by using Equation 1 above.

Meanwhile, a monocular camera oriented in a direction different from that of the front camera may also be set as a reference monocular camera.

Figure 10:
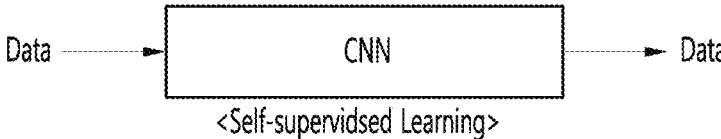
FIG. 10 is an exemplary diagram for describing a neural network using self-supervised learning, according to an embodiment.

FIG. 10 is an exemplary diagram for describing a neural network using self-supervised learning, according to an embodiment.

The depth map generation apparatus may train a neural network by using self-supervised learning. The depth map generation apparatus may train the neural network by using a surround-view image as input data of the neural network and using a depth map and a canonical camera motion as output data.

In an embodiment, the neural network may be trained such that an image reconstruction loss $L_{img}$ and a depth synthesis loss $L_{depth}$ according to Equation 2 below are minimized.

$$\mathcal{L} = \mathcal{L}_{img} + \mathcal{L}_{depth} \qquad \text{[Equation 2]}$$

In addition, the image reconstruction loss may include a temporal loss $L_t$, a spatio loss $L_{sp}$, and a spatio-temporal loss $L_{sp\_t}$ according to Equation 3 below. In Equation 3 below, $L_{smooth}$ refers to a smoothness loss.

$$\mathcal{L}_{img} = \mathcal{L}_1 + \lambda_{sp}\mathcal{L}_{sp} + \lambda_{sp\_t}\mathcal{L}_{sp\_t} + \lambda_{smooth}\mathcal{L}_{smooth} \qquad \text{[Equation 3]}$$

In addition, the depth synthesis loss may include a depth consistency loss $L_{cons}$ according to Equation 4 below. The depth consistency loss $L_{cons}$ denotes a penalty for a depth difference between a synthesized depth in a new view and a depth in each known camera view i.

$$\mathcal{L}_{depth} = \lambda_{cons}\mathcal{L}_{cons} + \lambda_{depth\_smooth}\mathcal{L}_{depth\_smooth} \qquad \text{[Equation 4]}$$

FIG. 11 is a flowchart for describing a method of generating a depth map by using a monocular camera, according to an embodiment.

Referring to FIG. 11, in operation 1110, a processor may obtain a surround-view image through one or more monocular cameras.

In operation 1120, the processor may generate multi-scale image features by encoding a base image included in the surround-view image.

In operation 1130, the processor may generate a single feature map for the base image by resizing each of the multi-scale image features based on a preset resolution and concatenating the resized multi-scale image features with each other.

In operation 1140, the processor may generate a volumetric feature by encoding the single feature map with depth information and then projecting a result of the encoding into a three-dimensional space.

In an embodiment, the processor may extract a local three-dimensional feature on the three-dimensional volumetric space by concatenating the single feature map with the depth information, encoding a result of the concatenating, and then projecting a result of the encoding into the three-dimensional space. Additionally, the processor may generate the volumetric feature by using the local three-dimensional feature.

In an embodiment, the processor may generate the volumetric feature by inputting the local three-dimensional feature to a volumetric encoder.

In an embodiment, the volumetric encoder may consist of a plurality of MLPs. The processor may allocate voxels to different MLPs according to whether the voxels overlap each other. The processor may generate the volumetric feature by fusing encoding results from the different MLPs together.

In operation 1150, the processor may generate a depth map of the surround-view image by decoding the volumetric feature using a depth decoder.

In an embodiment, the processor may transform the volumetric feature into a projected image feature having the preset resolution, based on an intrinsic parameter and an extrinsic parameter of a camera. The processor may generate the depth map of the surround-view image by using a depth decoder to decode the projected image feature.

In an embodiment, the processor may determine a projection matrix for transforming the volumetric feature into the projected image feature having the preset resolution. The processor may modulate the depth map by using the projection matrix suitable for a desired view.

In an embodiment, the processor may flatten the volumetric feature into a BEV feature. The processor may obtain a canonical camera motion indicating an amount of change in the camera pose of a reference monocular camera between the current time point and the next time point, by using a pose decoder to decode the BEV feature. The processor may collectively obtain pose information of other monocular cameras at the next time point, based on a relationship between extrinsic parameters of the reference monocular camera and the other monocular cameras, and a canonical camera motion.

In an embodiment, the processor may train a neural network by using a surround-view image as input data of the neural network and using a depth map and a canonical camera motion as output data.

The neural network may be trained such that an image reconstruction loss and a depth synthesis loss are minimized. The image reconstruction loss may include a temporal loss, a spatio loss, and a spatio-temporal loss. The depth synthesis loss may include a depth consistency loss.

Figure 12:
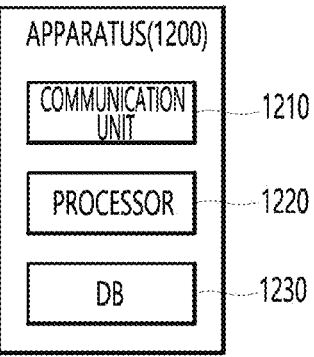
FIG. 12 is a block diagram of a depth map generation apparatus according to an embodiment.

FIG. 12 is a block diagram of a depth map generation apparatus according to an embodiment.

Referring to FIG. 12, a depth map generation apparatus 1200 may include a communication unit 1210, a processor 1220, and a database (DB) 1230. FIG. 12 illustrates the depth map generation apparatus 1200 including only the components related to an embodiment. Therefore, it would be understood by those of skill in the art that other general-purpose components may be further included in addition to those illustrated in FIG. 12.

The communication unit 1210 may include one or more components for performing wired/wireless communication with an external server or an external device. For example, the communication unit 1210 may include at least one of a short-range communication unit (not shown), a mobile communication unit (not shown), and a broadcast receiver (not shown).

The DB 1230 is hardware for storing various pieces of data processed by the depth map generation apparatus 1200, and may store a program for the processor 1220 to perform processing and control.

The DB 1230 may include random-access memory (RAM) such as dynamic RAM (DRAM) or static RAM (SRAM), read-only memory (ROM), electrically erasable programmable ROM (EEPROM), a compact disc-ROM (CD-ROM), a Blu-ray or other optical disk storage, a hard disk drive (HDD), a solid-state drive (SSD), or flash memory.

The processor 1220 controls the overall operation of the depth map generation apparatus 1200. For example, the processor 1220 may execute programs stored in the DB 1230 to control the overall operation of an input unit (not shown), a display (not shown), the communication unit 1210, the DB 1230, and the like. The processor 1220 may execute programs stored in the DB 1230 to control the operation of the depth map generation apparatus 1200.

The processor 1220 may control at least some of the operations of the depth map generation apparatus 1200 described above with reference to FIGS. 1 to 11. The depth map generation apparatus 1200 and the autonomous driving apparatus 40 may be the same apparatus, or at least some of the operations performed by the apparatuses may be the same.

The processor 1220 may be implemented by using at least one of application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, and other electrical units for performing functions.

In an embodiment, the depth map generation apparatus 1200 may be a mobile electronic device. For example, the depth map generation apparatus 1200 may be implemented as a smart phone, a tablet personal computer (PC), a PC, a smart television (TV), a personal digital assistant (PDA), a laptop computer, a media player, a navigation system, a camera-equipped device, and other mobile electronic devices. In addition, the depth map generation apparatus 1200 may be implemented as a wearable device having a communication function and a data processing function, such as a watch, glasses, a hair band, a ring, or the like.

In another embodiment, the depth map generation apparatus 1200 may be an electronic device embedded in a vehicle. For example, the depth map generation apparatus 1200 may be an electronic device that is manufactured and then inserted into a vehicle through tuning.

As another embodiment, the depth map generation apparatus 1200 may be a server located outside a vehicle. The server may be implemented as a computer device or a plurality of computer devices that provide a command, code, a file, content, a service, and the like by performing communication through a network. The server may receive data necessary for generating a depth map from devices installed in the vehicle, and generate the depth map based on the received data.

In another embodiment, a process performed by the depth map generation apparatus 1200 may be performed by at least some of a mobile electronic device, an electronic device embedded in the vehicle, and a server located outside the vehicle.

Embodiments of the present disclosure may be implemented as a computer program that may be executed through various components on a computer, and such a computer program may be recorded in a computer-readable medium. In this case, the medium may include a magnetic medium, such as a hard disk, a floppy disk, or a magnetic tape, an optical recording medium, such as a CD-ROM or a digital video disc (DVD), a magneto-optical medium, such as a floptical disk, and a hardware device specially configured to store and execute program instructions, such as ROM, RAM, or flash memory.

Meanwhile, the computer program may be specially designed and configured for the present disclosure or may be well-known to and usable by those skilled in the art of computer software. Examples of the computer program may include not only machine code, such as code made by a compiler, but also high-level language code that is executable by a computer by using an interpreter or the like.

According to an embodiment, the method according to various embodiments of the present disclosure may be included in a computer program product and provided. The computer program product may be traded as commodities between sellers and buyers. The computer program product may be distributed in the form of a machine-readable storage medium (e.g., a CD-ROM), or may be distributed online (e.g., downloaded or uploaded) through an application store (e.g., Play Store™) or directly between two user devices. In a case of online distribution, at least a portion of the computer program product may be temporarily stored in a machine-readable storage medium such as a manufacturer's server, an application store's server, or a memory of a relay server.

The operations of the methods described herein may be performed in any suitable order unless otherwise indicated herein or otherwise clearly contradicted by context. The present disclosure is not limited to the described order of the operations. The use of any and all examples, or exemplary language (e.g., 'and the like') provided herein, is intended merely to better illuminate the present disclosure and does not pose a limitation on the scope of the present disclosure unless otherwise claimed. In addition, various modifications, combinations, and adaptations will be readily apparent to those skill in the art without departing from the following claims and equivalents thereof.

Accordingly, the spirit of the present disclosure should not be limited to the above-described embodiments, and all modifications and variations which may be derived from the meanings, scopes and equivalents of the claims should be construed as failing within the scope of the present disclosure.

According to an embodiment of the present disclosure, a smooth depth map may be generated even when a camera pose, rather than an actual captured image, is arbitrarily modulated.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A method of generating a depth map by using a volumetric feature, the method comprising:
   obtaining a surround-view image through one or more monocular cameras;
   generating multi-scale image features by encoding a base image included in the surround-view image;
   generating a single feature map for the base image by resizing each of the multi-scale image features based on a preset resolution and concatenating the resized multi-scale image features with each other;
   generating a volumetric feature by encoding the single feature map with depth information and then projecting a result of the encoding into a three-dimensional space; and
   generating a depth map of the surround-view image by decoding the volumetric feature using a depth decoder.

2. The method of claim 1, wherein the generating of the volumetric feature comprises:
   extracting a local three-dimensional feature on the three-dimensional volumetric space by concatenating the single feature map with the depth information, encoding a result of the concatenating, and then projecting a result of the encoding into the three-dimensional space; and

generating the volumetric feature by using the local three-dimensional feature.

3. The method of claim 2, wherein the generating of the volumetric feature comprises generating the volumetric feature by inputting the local three-dimensional feature to a volumetric encoder.

4. The method of claim 3, wherein the volumetric encoder comprises a plurality of multi-layer perceptrons, and the generating of the volumetric feature further comprises:

allocating voxels to different multi-layer perceptrons according to whether the voxels overlap each other on the three-dimensional volumetric space; and generating the volumetric feature by fusing encoding results from the different MLPs together.

5. The method of claim 1, wherein the generating of the depth map comprises:

transforming the volumetric feature into a projected image feature having the preset resolution, based on an intrinsic parameter and an extrinsic parameter of the one or more monocular cameras; and generating the depth map of the surround-view image by using a depth decoder to decode the projected image feature.

6. The method of claim 5, further comprising:
determining a projection matrix for transforming the volumetric feature into the projected image feature having the preset resolution; and
modulating the depth map by using the projection matrix suitable for a desired view.

7. An apparatus for generating a depth map by using a monocular camera, the apparatus comprising:
a memory storing at least one program; and
a processor configured to execute the at least one program to obtain a surround-view image through one or more monocular cameras, generate multi-scale image features by encoding a base image included in the surround-view image, generate a single feature map for the base image by resizing each of the multi-scale image features based on a preset resolution and concatenating the resized multi-scale image features with each other, generate a volumetric feature by encoding the single feature map with depth information and then projecting a result of the encoding into a three-dimensional space, and generate a depth map of the surround-view image by decoding the volumetric feature using a depth decoder.

8. A non-transitory computer-readable recording medium having recorded thereon a program for causing a computer to execute the method of claim 1.

* * * * *